United States Patent [19] [11] 4,446,171
Thomas [45] May 1, 1984

[54] PROCESS OF MAKING GLASS ARTICLES HAVING ANTIREFLECTIVE COATING

[75] Inventor: Ian M. Thomas, Temperance, Mich.

[73] Assignee: Owens-Illinois, Inc., Toledo, Ohio

[21] Appl. No.: 348,622

[22] Filed: Feb. 12, 1982

[51] Int. Cl.$^3$ .................... B05D 1/18; B05D 5/06; C03C 17/25; G02B 1/10

[52] U.S. Cl. .................. 427/160; 427/106; 427/169; 65/60.52

[58] Field of Search ............... 65/60.52; 427/169, 160, 427/106; 428/315.5, 319.1

[56] References Cited

U.S. PATENT DOCUMENTS 2,740,726 4/1956 Anderson .
3,326,715 6/1967 Twells .
3,477,868 11/1969 Grundschober et al. .
4,271,210 6/1981 Toldas ................................ 427/169
4,273,826 6/1981 McCollister et al. .......... 427/160 X

OTHER PUBLICATIONS

Schroeder, "Oxide Layers Deposited From Organic Solutions", pp. 120–121, Physics of Thin Films, vol. 5, 1969, New York: Academic Press.

*Primary Examiner*—James R. Hoffman
*Attorney, Agent, or Firm*—David R. Birchall; Myron E. Click

[57] ABSTRACT

Disclosed is a process of making a glass article containing a thin surface film antireflective coating made by providing a dispersion containing at least one metalloorganic compound in solution and at least one organic polymer in solution, depositing a thin coating of such dispersion on the glass substrate, heating the film to drive off the solvent and to decompose and drive off the organic components and to eliminate or drive off the organic polymer, thus forming an oxide film from the remaining inorganic oxide components of such compound, said heating stopping short of causing consolidation of the oxide film, thus leaving a skeletonized surface film having a refractive index less than that of the film of said inorganic oxide if non-porous; and products resulting from such process.

4 Claims, No Drawings

PROCESS OF MAKING GLASS ARTICLES HAVING ANTIREFLECTIVE COATING

This invention relates to a process of making a glass article containing a thin surface film antireflective coating of a porous inorganic oxide.

Antireflective coatings are often applied to or formed on surfaces of glass articles such as windows, display cases, optical filters, optical lenses, and glass envelopes for collectors of solar energy to convert such energy to either heat or electricity.

In some of the foregoing applications, the main advantage is the lack of glare, and in others the important factor is the elimination or minimization of reflection losses which occur at each surface of a glass article.

As is well known, such losses are about four percent at each surface of a glass article, at least for an average glass having a refractive index of about 1.5 and for light incident on the surface at angles of less than about 40° to 50° from the normal. In the past and at present as well, vacuum deposition methods have been employed to deposit antireflective coatings on glass surfaces, particularly for optical purposes. There are a number of limitations to such processes, including the disadvantage of high cost and the difficulty in coating glass articles of complex configuration.

It has also been known to provide antireflective surfaces on articles made from certain glasses, by leaching the more readily dissolvable components, using etchant solutions and methods whereby the more soluble components are removed, leaving a skeletonized silica layer having an effective refractive index lower than that of the main bulk of the glass. Examples are the processes in U.S. Pat. Nos. 2,348,704; 2,486,431 and 2,490,662. In general, such etched coatings resulted in surface films of low abrasion resistance, low weatherability and poor chemical durability. Furthermore, they were not applicable to produce effective antireflective surface films on such difficultly-etched glasses as borosilicates. Moreover, in such processes there is little control over the pore volume obtained.

More recently, it has been suggested that the glass articles in question be formed from phase-separable glasses. See U.S. Pat. Nos. 4,019,884 and 4,086,074. In the latter patent in the paragraph common to columns 3 and 4 are cited references to a large number of glasses which will develop at least two phases of different solubility in a given etchant when subjected to a controlled heat treatment.

A disadvantage of processes such as are disclosed in the last two named patents is that one is severely limited in the glasses that can be employed. This is a particular disadvantage in many cases, such as in the formation of lenses or other optical components. Moreover, the glasses for such articles must be chosen essentially without regard to cost because one must first choose a glass that will in fact phase separate. For the same reason, the relevant optical and physical properties of the base glass must be secondary; thus, the composition of the base glass is severely limited by the requirement that it be capable of phase separation on heat treatment.

In Physics of Thin Films, Hass and Thus, editors, Vol. 5, Academic Press, New York and London 1969, pages 120-121, there is disclosed the deposition of a layer from alkali silicate solutions (the specific alkalis not identified), and eliminating alkali from the film by water, so that a highly porous $SiO_2$ skeleton with a refractive index of approximately 1.3 remains. The coating is said to be an antireflective coating, but it is technically inferior because it has little strength or abrasion resistance.

A more recent approach to making a porous glass antireflective coating on a glass surface is described in U.S. Pat. No. 4,273,826. In that method, a dispersion of at least one metallo-organic compound in a liquid solvent is made and the glass surface is coated therewith; thereafter, the solvent is eliminated and the inorganic components are eliminated by heat, thus forming a glass film layer which on further heating forms two or more phases, one which is thereafter leached to preferentially dissolve one of the phases, leaving a porous glass surface.

It is an object of the present invention to provide a simple method of producing a glass article having an antireflective coating derived from an inorganic oxide film applied to such article.

It is a further object of the present invention to provide a process for making a glass article with an antireflective coating which process overcomes many or all of the disadvantages and difficulties of the prior art.

It is another object of the invention to provide a process for making a glass article having an antireflective coating, which process is much more flexible than prior art processes.

It is a further object to provide a new product which is a result of the process of the present invention.

Other objects, as well as aspects and advantages, of the present invention will become apparent from a study of the accompanying specification and the claims.

According to the present invention, there is provided a process of making a glass article containing a thin surface film antireflective coating, which comprises (1) providing a dispersion containing at least one metallo-organic compound in solution and at least one organic polymer in solution;

(2) depositing a thin coating of such dispersion on the glass substrate;

(3) heating the film to drive off the solvent and to decompose and drive off the organic components and to eliminate or drive off the organic polymer;

thus forming an oxide film from the remaining inorganic oxide components of such compound, said heating stopping short of causing consolidation of the oxide film, thus leaving a skeletonized surface film having a refractive index less than that of the film of said inorganic oxide if non-porous.

Besides the clear advantages of being able to coat any glass, not just phase-separable glass, mentioned hereinbefore, it is also highly advantageous that the coating or film need not be made from an oxide composition that is phase-separable, nor is any etching step necessary.

The thickness of the porous oxide coating of the present process is less than 0.5 mm. There is usually little point, however, in making the coating anywhere near as thick as 0.5 mm. Thus, the coating is usually less than 0.1 mm and is in fact almost always less than one micron.

In general, the pores resulting from the heating step of my process are in the range from 50 to 800 angstroms across. With incident electromagnetic radiation of 2000 angstroms and above, the effective refractive index is intermediate that of the glass of the skeletonized film and of the voids. Furthermore, with the most usual very thin coating of less than one micron, there is no significant scattering of such electromagnetic radiation.

While it has been pointed out that one great advantage of the present process is that one is not limited as to what base glasses can be treated to form a porous oxide coating thereon from solution, it is, however, obvious that in most cases the temperature of the heating step used in preparing the coating must be below the fiber softening point of the base glass article, in order to avoid deforming the base glass article during such heat treatment. Of course, such heating might take place in special instances somewhat above the fiber softening point of the base glass of the article such as when the base glass article can be fully supported during such heating so that it will not become misshapen.

Because of its low index of refraction and its generally good chemical resistance properties, amorphous silica is often a preferred metal oxide coating useful in the present invention.

When such a coating of silica glass is used, it is often convenient to use as the metallo-organic compound a polyalkoxysiloxane made by partial hydrolysis of a tetraalkyl silicate such as a tetraethyl silicate.

The silicate can be hydrolyzed in any water miscible organic solvent, e.g., alcohols, alkoxyalcohols, ketones, dioxane, tetrahydrofuran. Lower aliphatic alcohols or alkoxyethanols are preferred.

The hydrolysis should be acid catalyzed, preferably using strong mineral acids. The silicate-water ratio should not exceed 1:4, preferably lower; otherwise, the solution may gel on standing.

In the method of the present invention, the ratio of the weight of the organic polymer used to the metal oxide, i.e., on a solvent-free basis, can vary widely according to results desired, but we have found a preferred ratio to be from 12:1 to 1:1, especially 7:1 to 5:1.

As will be seen in the illustrative examples which follow, the porous films of the invention can be simple oxides, such as the amorphous silica of Examples 1-4, 8 and 9, and the crystalline porous alumina of Example 5, or multicomponent glasses such as in Examples 6 and 7.

EXAMPLE 1

48 grams of a 25 percent solution of a medium molecular weight poly(methylmethacrylate) in xylene was diluted with isoamyl acetate (30 g) and isopropanol (20 g). A partially hydrolyzed ethyl silicate solution, a polyethoxysiloxane, (20 g of 10 percent $SiO_2$ equivalent in isopropanol) was added to this solution.

Microscope slides (75×38 mm) were dip coated in the resulting clear solution, air dried for a few minutes and then heated up to 400° C. over a period of two hours. They were held at 400° C. for two hours and then cooled to a room temperature.

The optical transmission was then measured using a Carey 17 spectrophotometer with the following results:
  at 700 nm transmission was 96.0 percent;
  at 650 nm transmission was 97.0 percent;
  at 600 nm transmission was 98.0 percent;
  at 550 nm transmission was 98.0 percent;
  at 500 nm transmission was 98.5 percent;
  at 450 nm transmission was 99.0 percent;
  at 400 nm transmission was 98.0 percent.

An uncoated slide has a transmission of about 92% over the whole wavelength range.

EXAMPLE 2

Nitrocellulose (30 g of 20 percent solution in methoxyethanol) was added to a partially hydrolyzed ethyl silicate (20 g of 10 percent $SiO_2$ equivalent in methoxyethanol). This solution was diluted with isopropanol (70 g). It was a clear solution.

The foregoing partially hydrolyzed ethyl silicate solution was prepared as follows:

Tetraethyl silicate (208 g: 1.00 mole) was mixed with methoxyethanol (356 g) and 0.5 N nitric acid solution (36 g) was then added. The resulting clear solution was left at room temperature overnight to allow hydrolysis and condensation to proceed. The product was a stable, clear solution of poly-ethoxysiloxane containing the equivalent of 10% $SiO_2$.

Microscope slides (75×38 mm) were dip coated in the polysiloxane-nitrocellulose solution, air dried for a few minutes and then heated to 350° C. over a period of two hours. They were held at 350° C. for one hour and then cooled to room temperature.

The optical transmission was measured with the following results:
  at 700 nm transmission was 94.5%;
  at 650 nm transmission was 95.0%;
  at 600 nm transmission was 95.0%;
  at 550 nm transmission was 95.0%;
  at 500 nm transmission was 94.5%;
  at 450 nm transmission was 94.5%;
  at 400 nm transmission was 94.0%.

When 60 g of nitrocellulose solution was used instead of 30 g, slightly inferior results were obtained, the maximum transmission being 94.5% at 650 nm.

EXAMPLE 3

Tetraethyl silicate (35 g) was mixed with isopropanol (59 g) and 1N nitric acid solution (6 g) was added. This gave a solution equivalent to 10 g $SiO_2$ in 100 g total.

Cellulose acetate butyrate solution in methoxyethanol (240 g of a 25% solution) was then added. (The cellulose acetate butyrate polymer used contains 47 weight percent butoxy groups, 2 weight percent acetoxy groups and 4.7 weight percent hydroxy groups.)

Plate glass samples approximately 3"×5"×⅛" were then dip coated in the above solution then heated slowly to 375° C. and held at this temperature for one hour. On cooling, a deep blue coating on the glass had been formed. The transmission of the glass was then measured with the following results:
  at 700 nm transmission was 96.5%;
  at 650 nm transmission was 97.5%;
  at 600 nm transmission was 98.5%;
  at 550 nm transmission was 99%;
  at 500 nm transmission was 99.5%;
  at 450 nm transmission was 99%;
  at 400 nm transmission was 98.5%.

An uncoated sample of glass plate has a transmission of about 92% at all visible wavelengths because of 4% reflection from each surface.

The coating could be scraped off the glass with a knife but was substantially unchanged when rubbed hard with a paper tissue.

A similar solution was prepared except that the isopropanol solvent was replaced by a mixture of iso-amyl acetate and 2-ethyl hexanol (approx. 70%/30%). 12" diagonal TV tubes were coated with this solution and then heated slowly to 375° C. and held at this temperature overnight.

A deep blue anti-reflective coating was formed on the faceplate and this was quite resistant to abrasion with a paper tissue.

EXAMPLE 4

12 grams of a 25% solution of polyvinyl alcohol in water (partially hydrolyzed polyvinyl alcohol containing 20–25 percent residual acetate groups, molecular weight about 10,000) was added to partially hydrolyzed tetraethyl silicate solution (20 g of 10% $SiO_2$ equivalent in isopropanol). Then the resulting PVA-polyethoxy siloxane solution was diluted with 170 g of methanol.

Microscope slides (75×38 mm) were dip coated in the resulting clear solution, air dried and then heated to 500° C. over a period of 3 hours. They were held at 500° C. for 30 minutes and then cooled to room temperature.

The optical transmission was measured with the following results:
at 700 nm transmission was 97.05%;
at 650 nm transmission was 97.5%;
at 600 nm transmission was 98.0%;
at 550 nm transmission was 98.0%;
at 500 nm transmission was 98.0%;
at 450 nm transmission was 98.0%;
at 400 nm transmission was 97.0%;

When 10 g of polymer solution and 25 g of the partially hydrolyzed ethyl silicate were used somewhat inferior results were obtained, the maximum transmission being 96.0% at 500 nm

EXAMPLE 5

Aluminum sec-butoxide (10 g) was dissolved in methoxyethanol (90 g) and acetyl acetone (10 g). This was then added to a solution of a medium molecular weight poly(methylmethacrylate) in xylene (48 g of 25% solution).

Microscope slides (75×38 mm) were then dip coated in the above solution, air dried for a few minutes and heated to 400° C. over a period of 3 hours. They were held at 400° C. for 16 hours and then cooled to room temperature.

The transmission was as follows:
at 700 nm transmission was 99.0%;
at 650 nm transmission was 99.0%;
at 600 nm transmission was 99.0%;
at 550 nm transmission was 98.5%;
at 500 nm transmission was 97.0%;
at 450 nm transmission was 96.0%;
at 400 nm transmission was 94.5%.

EXAMPLE 6

Tetraethyl silicate (20.8 g) was dissolved in methoxyethanol (50 g) and IN Nitric acid solution (1.8 g) added. The resulting polyethoxysiloxane solution was warmed to 60° C. and then allowed to cool to room temperature. Aluminum sec-butoxide (9.7 g) was then added and the clear solution diluted to a total weight of 100 g with methoxyethanol. This solution contains the equivalent of 8% total oxides of which 75% is $SiO_2$ and 25% is $Al_2O_3$.

25 g of the above solution was added to 48 g of the 25% solution of cellulose acetate butyrate in methoxyethanol described in Example 3, and the resulting solution was made up to a total weight of 150 g by diluting with more methoxyethanol.

Microscope slides (75×38 mm) were dip coated in this solution, air dried for a few minutes and then heated slowly to 400° C. over a period of 2 hours. They were held at 400° C. overnight and then cooled to room temperature.

The transmission was as follows:
at 700 nm transmission was 95.5%;
at 650 nm transmission was 96.0%;
at 600 nm transmission was 96.0%;
at 550 nm transmission was 96.0%;
at 500 nm transmission was 96.0%;
at 450 nm transmission was 96.0%;
at 400 nm transmission was 95.0%.

EXAMPLE 7

Tetraethyl silicate (139 g) was dissolved in methoxyethanol (150 g) and water (11.0 g) and IN nitric acid solution (1.0 g) added. The resulting poly-ethoxy siloxane solution was warmed to 60° C. and allowed to cool to room temperature. Aluminum sec-butoxide (5.9 g) and tri-methoxyethyl borate in methoxyethanol (45.0 g, equivalent to 6.45 g $B_2O_3$) were then added. Sodium acetate (5.6 g) was dissolved in water (12.0 g) and the solution added to the alumino-borosilicate solution. A clear homogeneous solution resulted which was diluted to a total weight of 400 g with methoxyethanol. The product contains the equivalent of 8% oxides, the composition of the latter being 80.2% $SiO_2$, 2.5% $Al_2O_3$, 12.9% $B_2O_3$ and 4.3% $Na_2O$.

25 g of the above solution was added to 48 g of a solution of the cellulose acetate butyrate polymer in methoxyethanol, described in Example 3, and the resulting solution was diluted to a total weight of 150 g with more methoxyethanol.

Microscope slides (75×38 mm) were dip coated in the solution, air dried for a few minutes and then heated slowly to 400° C. over a period of 2 hours. They were held at 400° C. for 2 hours and then cooled to room temperature.

The transmission was as follows:
at 950 nm transmission was 98.0%;
at 900 nm transmission was 98.0%;
at 850 nm transmission was 98.0%;
at 800 nm transmission was 98.0%;
at 750 nm transmission was 97.5%;
at 700 nm transmission was 97.0%;
at 650 nm transmission was 96.5%;
at 600 nm transmission was 95.0%;
at 550 nm transmission was 94.0%;
At 500 nm transmission was 93.0%;
at 450 nm transmission was 92.0%.

EXAMPLE 8

18 g of a 70% solution of Celanese Poly-Tex 975 resin (a hydroxyl functional acrylic resin with a hydroxyl equivalent weight of 365) in ethyl acetate was diluted with isoamyl acetate (60 g) and to this was added a partially hydrolyzed ethyl silicate solution (20 g of 10% $SiO_2$ equivalent in methoxyethanol), made as described in Example 2.

Microscope slides (75×38 mm) were dip coated in the resulting clear solution, air dried for a few minutes and then heated to 400° C. over a period of two hours. They were held at 400° C. overnight and then cooled to room temperature.

The optical transmission was then measured with the following results:
at 700 nm transmission was 95.5%;
at 650 nm transmission was 96.5%;
at 600 nm transmission was 97.0%;
at 550 nm transmission was 98.0%;
at 500 nm transmission was 98.0%;
at 450 nm transmission was 97.5%;
at 400 nm transmission was 95.5%.

EXAMPLE 9

12 grams of Celanese Epi-Rez 502 (a low molecular weight aliphatic diglycidyl ether, having an epoxy equivalent weight of 300–325) was added to 68 grams of the poly-ethoxysiloxane described in Example 2, and the mixture was diluted to a clear solution with 68 grams of isopropanol.

Microscope slides (75×38 mm) were dip coated in the resulting clear solution, air dried for a few minutes and then heated to 400° C. over a period of two hours. They were then held at 400° C. for 2 hours and cooled to room temperature.

The optical transmission was measured with the following results:
- at 700 nm transmission was 96.5%;
- at 650 nm transmission was 96.5%;
- at 600 nm transmission was 97.0%;
- at 550 nm transmission was 97.0%;
- at 500 nm transmission was 96.0%;
- at 450 nm transmission was 93.5%;
- at 400 nm transmission was 92.0%.

As will be evident to those skilled in the art, various modifications of this invention can be made or followed in the light of the foregoing disclosure and discussion without departing from the spirit and scope of the disclosure or from the scope of the claims.

I claim:
1. A process of making a glass article containing a thin surface film antireflective coating comprising the steps of
   (1) providing a noncolloidal dispersion containing at least one metallo-organic compound in solution and at least one organic polymer in solution,
   (2) depositing a thin coating of such dispersion on the glass substrate,
   (3) heating the film to drive off the solvent and to decompose and drive off the organic components and to eliminate or drive off the organic polymer, thus forming an inorganic oxide film from the remaining inorganic oxide components of such compound, said heating stopping short of causing consolidation of the oxide film, thus leaving a skeletonized, porous surface film having an effective refractive index less than that of a non-porous film of said inorganic oxide.
2. A process according to claim 1 wherein said inorganic oxide coating is a porous silica film.
3. A process according to claim 1 wherein said inorganic oxide coating is a porous alumina film.
4. A process according to claim 1 wherein said inorganic oxide coating is a porous multicomponent glass film.

* * * * *